(12) United States Patent
Kummings

(10) Patent No.: US 7,316,436 B1
(45) Date of Patent: Jan. 8, 2008

(54) DIFFERENTIAL WHEEL MOUNTING FOR RAILROAD CAR

(76) Inventor: John Kummings, 510 E. Wabash Ave., Crawfordsville, IN (US) 47933

( * ) Notice: Subject to any disclaimer, the term of this patent is extended or adjusted under 35 U.S.C. 154(b) by 22 days.

(21) Appl. No.: 11/359,652

(22) Filed: Feb. 22, 2006

(51) Int. Cl.
*B60B 37/12* (2006.01)
(52) U.S. Cl. .............................. 295/37; 295/43; 295/44
(58) Field of Classification Search .................... 295/1, 295/35, 36.1, 37, 43, 44, 42, 42.1
See application file for complete search history.

(56) References Cited

U.S. PATENT DOCUMENTS

| | | | |
|---|---|---|---|
| 12,572 A | 3/1855 | Prentiss | |
| 36,790 A | 10/1862 | Northrop | |
| 50,579 A | 10/1865 | Harris | |
| 52,949 A | 3/1866 | Babson | |
| 70,560 A | 11/1867 | Harris | |
| 180,247 A | 7/1876 | Levake | |
| 276,211 A | 4/1883 | Baldwin | |
| 448,683 A | 3/1891 | Silverthorn | |
| 509,409 A | 11/1893 | Totten | |
| 570,525 A | 11/1896 | West | |
| 751,243 A * | 2/1904 | Austin | 105/49 |
| 905,532 A | 12/1908 | Hoffman | |
| 935,962 A | 10/1909 | Church | |
| 1,038,962 A | 9/1912 | Rivers | |
| 1,104,562 A | 7/1914 | Slattery | |
| 1,108,867 A * | 8/1914 | Muggley | 295/35 |
| 1,164,470 A * | 12/1915 | Coan | 295/36.1 |
| 1,346,756 A | 7/1920 | Lewis | |
| 1,355,575 A | 10/1920 | Sederholm | |
| 1,463,196 A | 7/1923 | Cochran | |
| 1,532,581 A | 4/1925 | Elkins | |
| 1,637,906 A * | 8/1927 | Klein | 295/44 |
| 1,708,608 A | 4/1929 | Edmunds | |
| 1,712,750 A | 5/1929 | Clasen | |
| 1,720,457 A | 7/1929 | Weckstein | |
| 1,742,825 A | 1/1930 | Sanders | |
| 1,742,826 A | 1/1930 | Sanders | |
| 1,876,564 A | 9/1932 | Buckwalter | |
| 1,882,231 A | 10/1932 | Oelkers | |
| 2,035,919 A | 3/1936 | Proffitt | |
| 2,039,351 A | 5/1936 | Shafer | |
| 2,046,448 A | 7/1936 | De Buigne | |
| 2,049,118 A | 7/1936 | Huguenin | |

(Continued)

FOREIGN PATENT DOCUMENTS

GB            2180807            4/1987

(Continued)

*Primary Examiner*—Russell D. Stormer
(74) *Attorney, Agent, or Firm*—Woodard, Emhardt, Moriarty, McNett & Henry LLP

(57) ABSTRACT

A differential wheel mounting for replacing a standard railroad axle assembly having a wheel seat portion which includes a sleeve having several sliding surfaces fixedly mounted over the wheel seat portion of the axle, a railroad wheel with a running surface for contacting a rail and a plain bearing member detachably mounted to the railroad wheel. The plain bearing member has non-metallic bearing surfaces that mate with the sliding surfaces on the sleeve so that the bearing member and the attached wheel are laterally confined on the sleeve while being rotatable about the sleeve. The plain bearing member sustains both radial and thrust loads during normal operation of a railroad car.

30 Claims, 7 Drawing Sheets

U.S. PATENT DOCUMENTS

| | | |
|---|---|---|
| 2,106,345 A | 1/1938 | Frede |
| 2,364,110 A | 12/1944 | Troutman |
| 2,536,313 A | 1/1951 | Schaub |
| 3,697,119 A | 10/1972 | Van Wierst |
| 3,802,352 A | 4/1974 | Keller |
| 4,005,915 A | 2/1977 | Canfield |
| 4,318,564 A | 3/1982 | Brauer |
| 4,420,179 A | 12/1983 | Brauer |
| 4,575,145 A * | 3/1986 | Wolfram et al. ............... 295/37 |
| 5,509,738 A * | 4/1996 | Haynes et al. ............... 384/275 |
| 5,884,956 A | 3/1999 | Pasquin |
| 5,988,720 A | 11/1999 | Fridberg |
| 6,007,126 A | 12/1999 | Blasingame et al. |
| 6,048,015 A | 4/2000 | Blasingame et al. |
| 6,189,456 B1 * | 2/2001 | Smith et al. ............. 105/218.1 |
| 6,598,920 B1 | 7/2003 | Blasingame et al. |
| 6,623,057 B1 | 9/2003 | Blasingame et al. |
| RE38,511 E | 5/2004 | Fridberg |
| 6,880,469 B2 * | 4/2005 | Frost .......................... 105/154 |

FOREIGN PATENT DOCUMENTS

| | | | |
|---|---|---|---|
| JP | 5-131801 | * | 5/1993 |
| WO | WO 99/34988 | | 7/1999 |
| WO | WO 99/39926 | | 8/1999 |

* cited by examiner

DIFFERENTIAL WHEEL MOUNTING FOR RAILROAD CAR

BACKGROUND OF THE INVENTION

1. Field of the Invention

The present invention resides generally in the field of differential wheel mounting for railroad cars.

2. Description of Related Art

Wheelsets commonly in use on the majority of freight railroad cars in the United States have two wheels firmly press-fit onto a common axle over a raised wheel seat. This provides a very high torsional rigidity between the two wheels which forces the two wheels to rotate at the same rotational velocity. The wheel set assembly may be supported by either journal bearings out-board of each wheel, normally at the end of the axle, or the bearings may be located in-board of the wheels. The running surfaces of the wheels are generally profiled such that the wheels are effectively conical in shape, at least when new. However, wheel wear normally quickly changes the straight cone to a hollowed cone in which the effective conicity of the running surface varies with the lateral position of the running surface.

The combination of the effective coning of the wheel's running surface and the rigid axle connection between the two wheels provides the basic mechanism by which a conventional axle with two fixed wheels steers itself. If the wheels are laterally displaced from the center of the track, the wheel that is closer to flange contact has a larger rolling radius than the other wheel. Approximately equal and opposite longitudinal forces are generated on the wheels as the wheel with a larger rolling radius pulls the wheelset forward while the wheel with the small rolling radius pulls the wheelset back. This creates a moment than induces a yaw in the wheelset. This yaw tends to "steer" the wheelset toward the centerline of the track. However, this characteristic of self steering can lead to oscillatory instability otherwise known as hunting, especially at high speeds.

Another problem with conventional railroad wheelsets is encountered on curved sections of track. Operation over sections of curved track ideally requires the wheels to rotate at different speeds because the wheel on the outside rail has to traverse more rail than the wheel on the inside rail. When the wheels are coupled together, the different speeds the wheels are forced to rotate cause slippage between one or both wheels and the rails while traversing curves. This slippage causes wear on both the running surfaces of the wheels and the rails and is a significant cause of maintenance to both wheels and track. Furthermore, the constant slipping that occurs on curved sections of track significantly increases the rolling resistance generated by the conventional wheelset.

As a solution primarily to the problem of slippage while traversing curved sections of track, various wheel and axle constructions have been previously disclosed which permit one or both wheels on a common axle to rotate independently of that axle, i.e., differential wheel rotation. However, these previous arrangements have either been complicated and costly or have lacked sufficient durability to be useful or have otherwise not been accepted in the marketplace.

Nevertheless, the search for a viable solution to these problems common to the railroad industry has continued on over the years. With the nation and world possibly turning more to rail travel for goods and people in the future with ever-growing fuel and energy concerns, this need may be even greater in the years to come. That need is the reason and subject of the present invention.

BRIEF SUMMARY OF THE INVENTION

A preferred embodiment of the present invention includes an improved differential wheel mounting for replacing a standard railroad axle assembly having a wheel seat portion which includes a sleeve having several sliding surfaces fixedly mounted over the wheel seat portion of the axle, a railroad wheel with a running surface for contacting a rail, and one or more plain bearing members which are detachably mounted to the railroad wheel. The plain bearing members preferably have non-metallic bearing surfaces that mate with the sliding surfaces on the sleeve so that the bearing members and the attached wheel are laterally confined on the sleeve while being rotatable about the sleeve. Each plain bearing member sustains both radial and thrust loads.

In one preferred form of the invention, a differential wheel mounting is disclosed for use on railroad cars having a railroad car axle with a wheel seat portion adjacent to at least one end and a wheel rotatably mounted relative to the axle on the wheel seat portion. The preferred second wheel mounting comprises: a sleeve for fixedly mounting on the wheel seat portion of the axle, said sleeve having sliding surfaces; a railroad wheel having a running surface for contacting a rail; and a plain bearing member detachably mountable to said railroad wheel and laterally confined on said sleeve, said plain bearing member having non-metallic bearing surfaces which mate with said sliding surfaces on said sleeve to sustain radial and thrust loads experienced during normal operation.

In another preferred form of the invention, a differential wheel mounting is disclosed for a railroad car having a standard railroad car axle with a raised wheel seat portion and a journal bearing adjacent to at least one end. The preferred differential wheel mounting comprises: a sleeve mounted to the raised wheel seat portion on the axle, said sleeve having a first shoulder and including a first keeper; a railroad wheel having a running surface for contacting a rail and a second shoulder and including a second keeper; and a plain bearing member positioned between said sleeve and said wheel; wherein said first shoulder and said first keeper laterally confine said bearing member within and against said sleeve and said second shoulder and said second keeper laterally confine said bearing member within and against said wheel; wherein said bearing member sustains radial and thrust loads during normal operation of the railroad car; and wherein said bearing member allows for rotationally slippage relative to said railroad wheel and said sleeve.

In another preferred form of the invention, a method is disclosed for retrofitting a railroad car axle having fixed wheels mounted on wheel seat portions with at least one differential wheel mounting, the method comprising the steps of: removing the preexisting wheel from one wheel seat portion of the axle; securely mounting a sleeve on the wheel seat portion; detachably mounting a plain bearing member to a railroad wheel having an outer running surface for contacting a rail; and rotationally mounting the plain bearing member on the sleeve so that the plain bearing member is laterally confined on the sleeve to sustain radial and thrust loads experienced during normal operation.

DETAILED DESCRIPTION OF THE INVENTION

Figure 1:
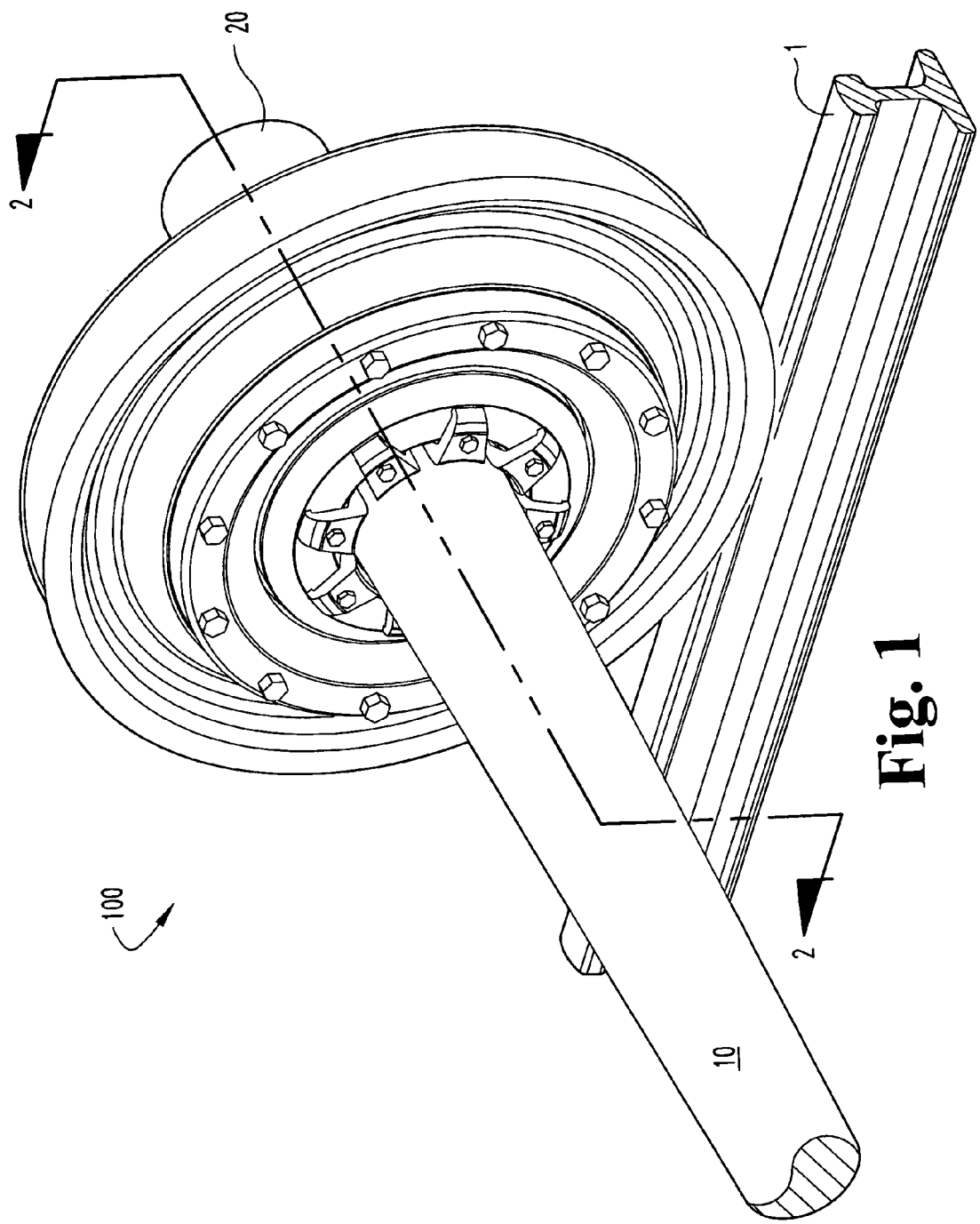
FIG. 1 is a perspective view of the preferred embodiment of the present invention.

While the present invention may be embodied in many different forms, for the purpose of promoting an understanding of the principles of the present invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the present invention as described herein are contemplated as would normally occur to one skilled in the art to which the invention relates.

Figure 2:
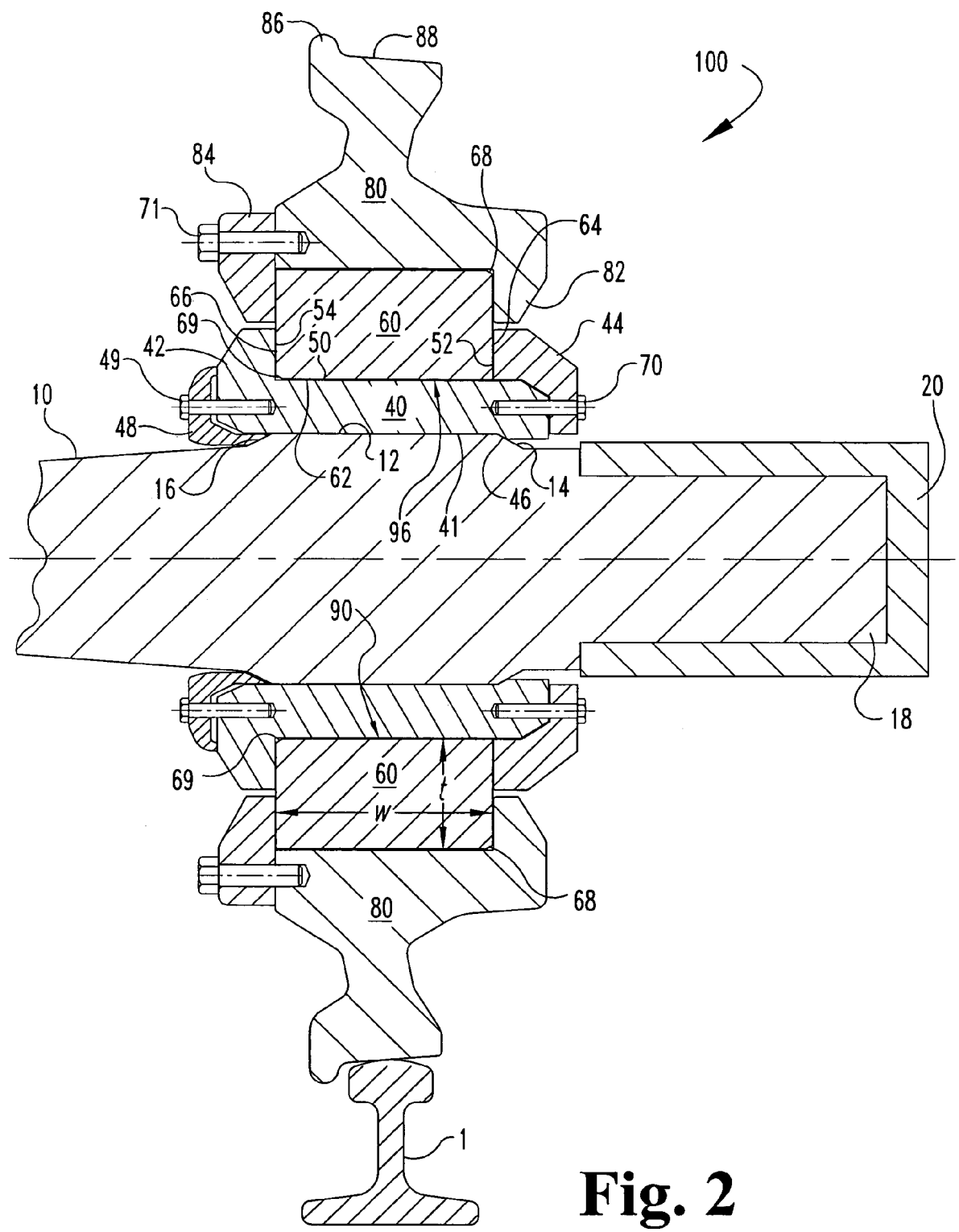
FIG. 2 is a transverse sectional view of the structure in FIG. 1 along section line 2-2 of FIG. 1.
Figure 3:
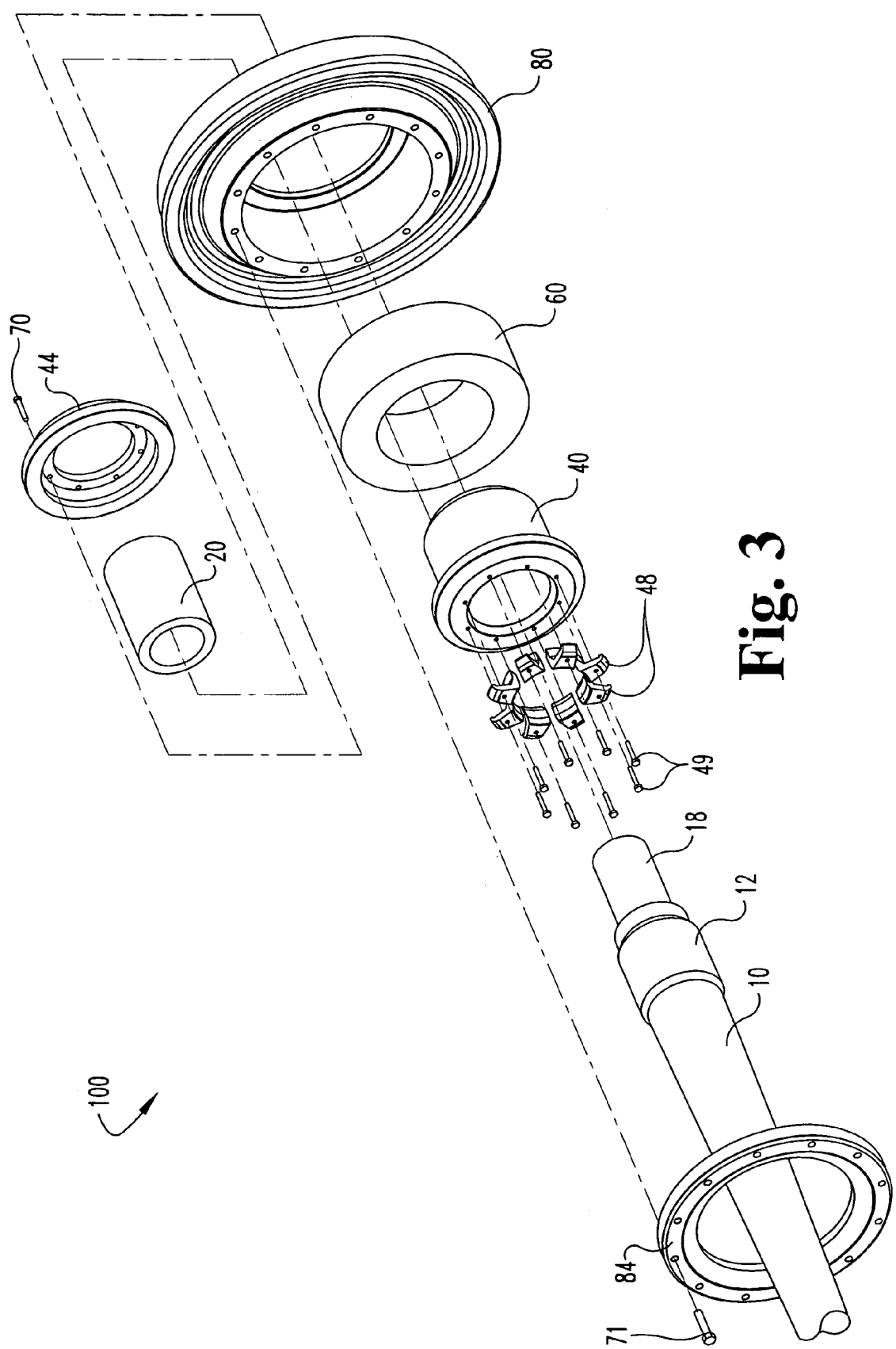
FIG. 3 is an exploded view of the components of FIG. 1 and FIG. 2.
Figure 4:
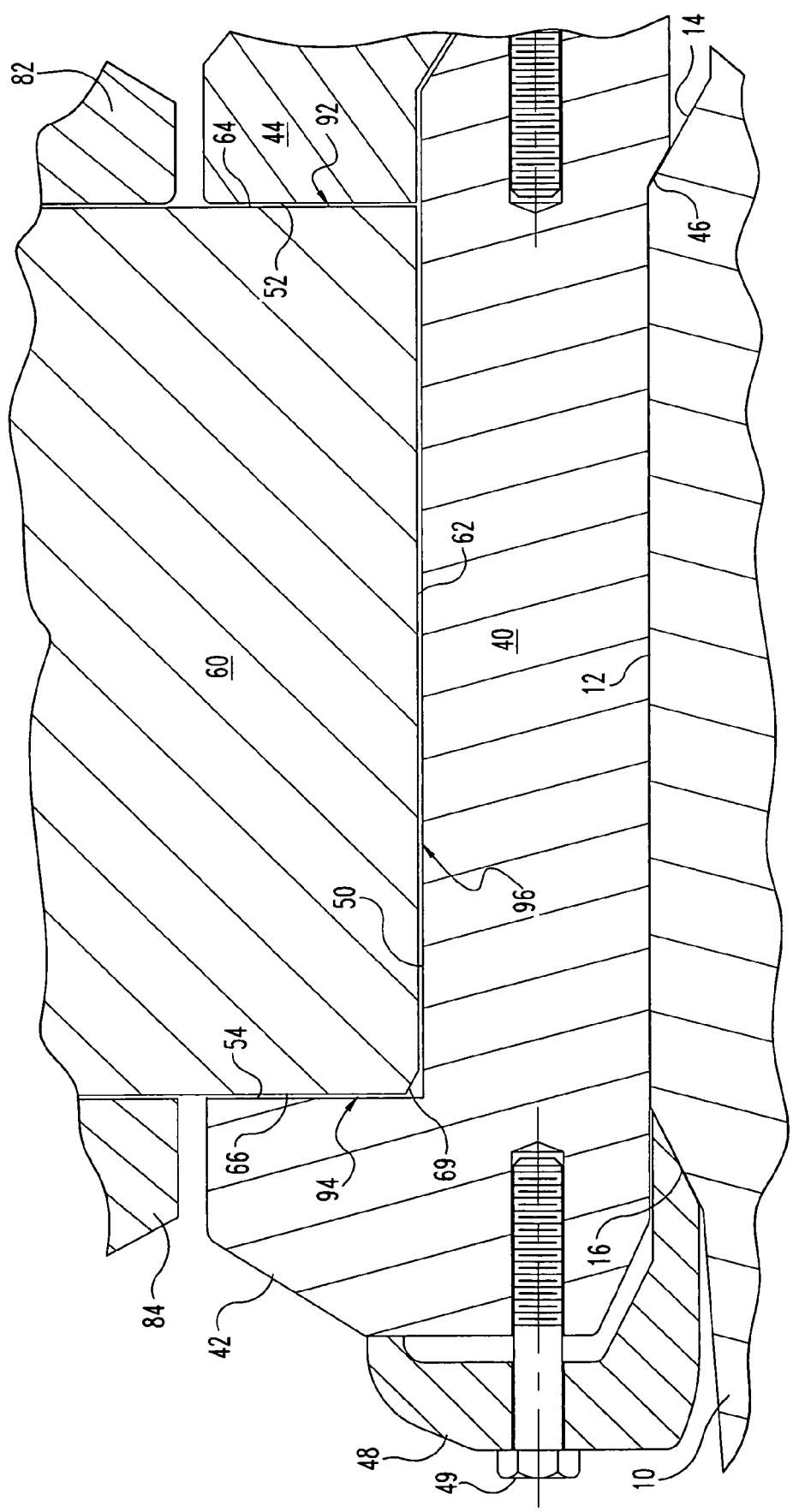
FIG. 4 is a sectional view of a portion of FIG. 2.

Referring to the drawings in detail, and first in particular to FIGS. 1-3, a preferred embodiment of a differential wheel mounting, indicated generally as 100, is shown as attached to a railroad car axle 10 having a raised wheel seat portion 12 as is common. The raised wheel seat portion 12 normally includes an outboard taper 14 and an inboard taper 16 which substantially transitions the diameter of axle 10 from the raised wheel seat portion 12 to the smaller axle diameter on either side of raised wheel seat portion 12 as shown in FIGS. 2 and 4. Railroad car axle 10 normally has a standard railroad wheel press fit on the other end of the axle (not illustrated) and normally is connected to a railroad wheel truck assembly (not illustrated) via two journal bearings (one journal bearing 20 is illustrated in FIGS. 1-3.) The railroad wheel truck assembly is connected to various types of railroad cars in any manner known to those skilled in the art.

The preferred differential wheel mounting 100 shown in the drawings then generally includes: 1) sleeve 40 mounted on raised wheel seat 12; 2) plain bearing member 60 rotationally coupled to sleeve 40 such that plain bearing member 60 can rotate about sleeve 40, but lateral movement in either direction along the axis of the axle relative to sleeve 40 is substantially confined; 3) railroad wheel 80 securely mounted to bearing member 60 such that railroad wheel 80 can rotate with bearing member 60, while both bearing member 60 and wheel 80 are also laterally confined with respect to sleeve 40. When preferred differential wheel mounting 100 is assembled, wheel 80 is rotationally engaged relative to sleeve 40 on axle 10. In this regard, "plain bearing" as used herein refers to a bearing member which carries a load by sliding as a result of surface to surface contact, without rollers, ball bearings or any other mechanical means being employed. Unless specified otherwise, all bearings 60 referred to herein are intended to be plain bearings within this definition. Furthermore, as used herein, "laterally confined" refers to a bearing or other member being generally held or retained in place relative to some other member (but may include some slip or play being present in light of assembly tolerances and expected wear characteristics between components consistent with industry standards.)

Referring further to FIGS. 2-4, sleeve 40 preferably is adapted to be press fit on raised wheel seat 12 utilizing methods known to those skilled in the art. However, in one preferred embodiment of the invention, sleeve 40 is press fit on the raised wheel seat 12 utilizing substantially less force than is normally utilized to press fit a standard railroad wheel of a particular size on the raised wheel seat 12. In this embodiment, deformation of sleeve 40 due to being tightly press fit on the raised wheel seat 12 is minimized. In another embodiment of the invention, sleeve 40 is press fit on the raised wheel seat 12 using substantially similar force that is commonly utilized to press fit a standard railroad wheel on the raise wheel seat 12, which is known to be between about 90-160 tons for 36" wheels or between about 80-150 tons for 33" wheels.

Sleeve 40 also preferably includes an interior lip 46 as illustrated in FIGS. 2 and 4. Interior lip 46 preferably limits how far sleeve 40 can be press fit over the raised wheel seat portion 12 by engaging outboard taper 14 when sleeve 40 is located sufficiently far inboard. Interior lip 46 can be oriented at an angle or other geometry corresponding to substantially mate with the angle of outboard taper 14; or, in the alternative, interior lip 46 can make a substantially 90 degree angle (not illustrated) relative to sleeve interior 41. In yet another embodiment, outboard taper 14 can be modified by machining a standard axle to have a 90 degree shoulder in lieu of a taper to better interface with alternate embodiments of sleeve 40 and sleeve clamps 48. However, the precise geometry of interior lip 46 is not believed critical, and any geometry known to those skilled in the art is contemplated within the scope and coverage of the invention herein.

In any case, when interior lip 46 is engaged with outboard taper 14 as illustrated in FIGS. 2 and 4, interior lip 46 may also function to transfer axial forces between axle 10 and sleeve 40, as is the case in the preferred embodiment, in which the force used to press fit sleeve 40 onto wheel seat 12 is thereby reduced. In addition, as illustrated in FIG. 3, a number of sleeve clamps 48 are preferably mounted around the inboard side of sleeve 40 utilizing bolts 49 such that each sleeve clamp 48 exerts pressure on inboard taper 16 as illustrated in FIG. 4. When thus engaged as illustrated in FIG. 4, sleeve 40 is thereby preferably firmly affixed to axle 10 regardless of the force used to press fit sleeve 40 onto wheel seat 12. In yet another embodiment, inboard taper 16 can be modified by machining a standard axle to have a 90 degree shoulder in lieu of a taper. In this embodiment the geometry of sleeve clamps 48 would preferably also be altered to include a blunt end to maximize the interface with modified inboard taper 16.

Sleeve 40 also preferably includes a shoulder 42 and a keeper ring 44 as illustrated in FIGS. 2 and 4. Moreover, sleeve 40, shoulder 42 and keeper ring 44 preferably form a circumferential recess that retains plain bearing 60 within sliding surfaces 50, 52 and 54 such that bearing surfaces 62, 64, and 66 are slideably engaged against sliding surfaces 50, 52 and 54 and bearing 60 rotates about sleeve 40 while being substantially confined from movement in a lateral direction along the axle 10. Sleeve 40, shoulder 42 and keeper ring 44 are preferably constructed of stainless steel. However, other materials and configurations are also envisioned for sleeve 40, shoulder 42 and keeper ring 44 within the scope and coverage of this invention. Sliding surfaces 50, 52 and 54 are preferably hardened and polished or otherwise treated such as known in the art to increase their wear resistance characteristics. Keeper ring 44 is preferably mounted on sleeve 40 with a number of bolts 70 spaced around the circumference for stability and strength. In an alternative embodiment, shoulder 42 could also be removably mounted directly on sleeve 40 utilizing bolts spaced around its circumference. In this embodiment, shoulder 42 would preferably be separated from sleeve 40 in a fashion similar to the separation of keeper ring 44 so that shoulder 42 does not contact wheel seat 12 (not illustrated). In yet another embodiment, through bolts could be used to secure keeper ring 44 and shoulder 42 onto sleeve 40 (not illustrated). However, it is understood and intended that any means for fastening keeper ring 44 or shoulder 42 to sleeve 40 known to those skilled in the art is contemplated by the present invention.

Plain bearing 60 is then preferably a combination bearing in the sense that it effectively carries or sustains both radial loads normal to axle 10 and thrust loads substantially along the axis of axle 10. In the preferred embodiment, bearing 60 transfers all loads between wheel 80 and sleeve 40 and is sufficient in terms of construction, strength and stability to support the load of a loaded railroad car in and during normal operation.

Figure 10:
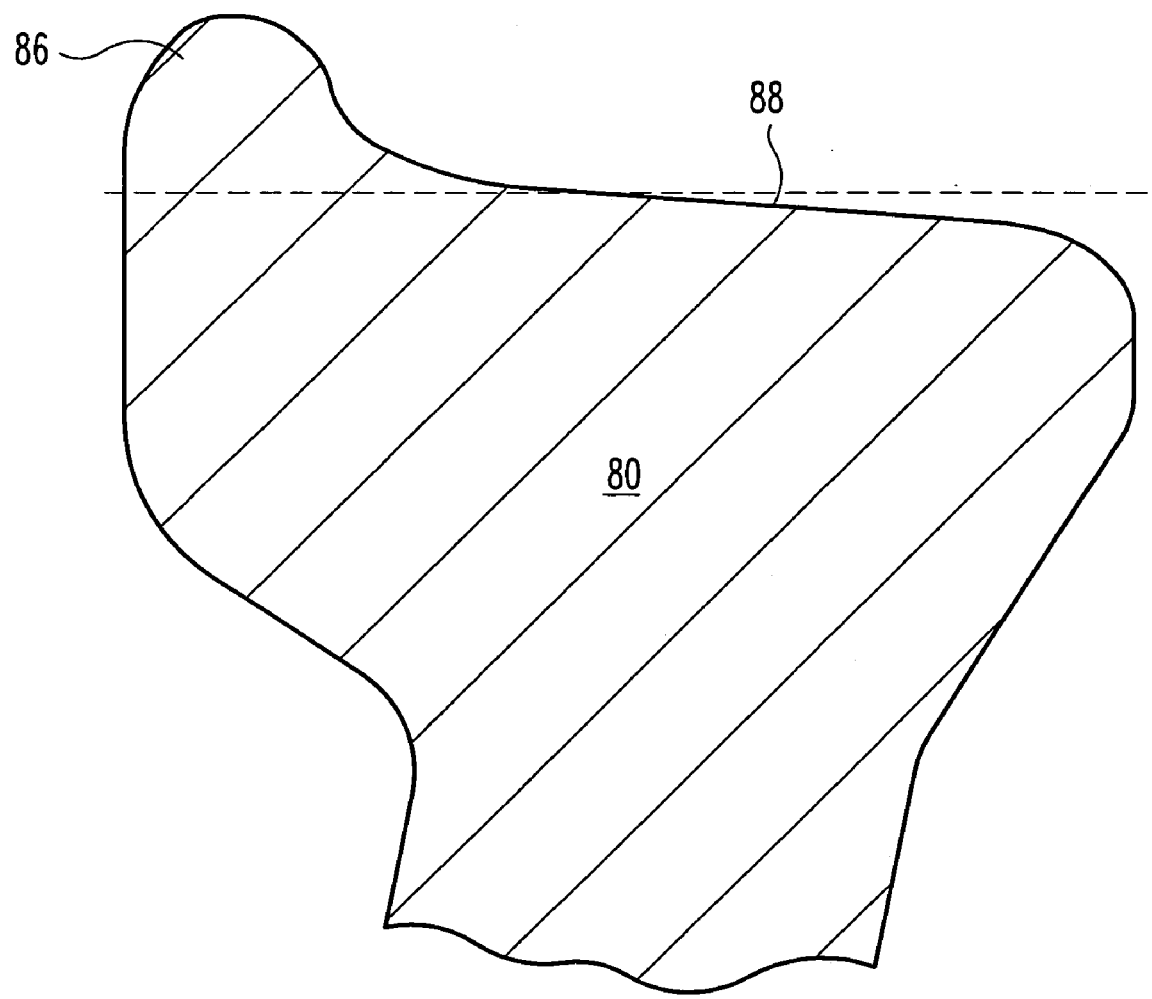
FIG. 10 is an cross sectional view illustrating an embodiment of the wheel running surface.

As illustrated in FIG. 2, plain bearing 60 is also preferably fixedly mounted in railroad wheel 80. To accomplish this, railroad wheel 80 preferably also includes a shoulder 82 and a removable keeper ring 84 which substantially secure bearing member 60 inside wheel 80. Railroad wheel 80 preferably also includes flange 86 and running surface 88, both adapted to contact rail 1 as shown in FIGS. 1 and 2. Running surface 88 may have a tread slope of about 1:20 as illustrated in FIG. 10, which is in line with some thoughts as to industry standards for new wheel construction. However, running surface 88 can be any other desired slope or shape as would be known to or used by those skilled in the art. While it is preferable that bearing 60 be fixedly mounted in railroad wheel 80, it is also preferable that bearing 60 be removable from wheel 80 when necessary as illustrated in FIG. 3. Separating bearing 60 and wheel 80 preferably permits replacement or maintenance of either bearing 60 or wheel 80 to occur independently of the replacement or maintenance requirements of the other. Furthermore, as new or better performing or lower cost materials become available, it is possible to replace one component without unnecessarily replacing the other component if that is desired.

In an alternate embodiment, it is envisioned that the relative rotation of the wheel with respect to the sleeve may occur between wheel 80 and bearing 60 instead of or in addition to between bearing 60 and sleeve 40. In this embodiment, wheel 80 could engage plain bearing 60 in a manner similar to where bearing 60 is slidably engaged with sleeve 40 as in the preferred embodiment above. In this embodiment, for example, it could be beneficial for the surfaces on wheel 80 that could slide with respect to bearing 60 to be a material with good wear characteristics such as hardened and polished stainless steel.

Preferred keeper ring 84 is then mounted on wheel 80 with a number of bolts 71 spaced around the circumference as shown in FIG. 1. In an alternative embodiment, shoulder 82 could be a separate member that is also removably mounted on wheel 80 utilizing bolts spaced around the circumference to secure shoulder 82 onto wheel 80 (not illustrated). In another embodiment, through bolts could again be used to secure both ring 84 and shoulder 82 onto wheel 80 (not illustrated). However, any means for fastening ring 84 and shoulder 82 onto wheel 80 known to those skilled in the art is contemplated herein as well.

Separation of bearing 60 from sleeve 40 to perform maintenance can also preferably and readily be accomplished with an economy of steps in the preferred embodiments of the present invention. Specifically, as illustrated in FIG. 3 for example, it is preferable that keeper 44 and bearing 60 can be disengaged from sleeve 40 and removed from axle 10 without disturbing or removing journal bearing 20. Keeper 44 preferably fits over journal bearing 20 or, alternatively, keeper 44 can be split into several pieces (not illustrated) which can be individually removed while journal bearing 20 is in place on axle 10. The smallest internal diameter of bearing 60 is preferably large enough that bearing 60, with wheel 80 attached, can still be removed from sleeve 40 and axle 10 over journal bearing 20. This arrangement preferably simplifies maintenance procedures and can be a significant time and money savings to the railroad during normal operation.

While the particular shape and dimensions of bearing member 60 may vary according to the embodiments described herein, the preferred configuration of bearing member 60 as depicted in FIGS. 2 and 3 is generally ring shaped having a width w a thickness t as shown in FIG. 2. From testing thus far, it is preferred that width w should be at least about two times the dimension of thickness t. In a typical 36" wheel arrangement, as generally represented in FIGS. 2 and 3, preferred bearing member 60 is shown with a thickness t of about 4 inches and a width w of about 8 inches.

Figure 11:
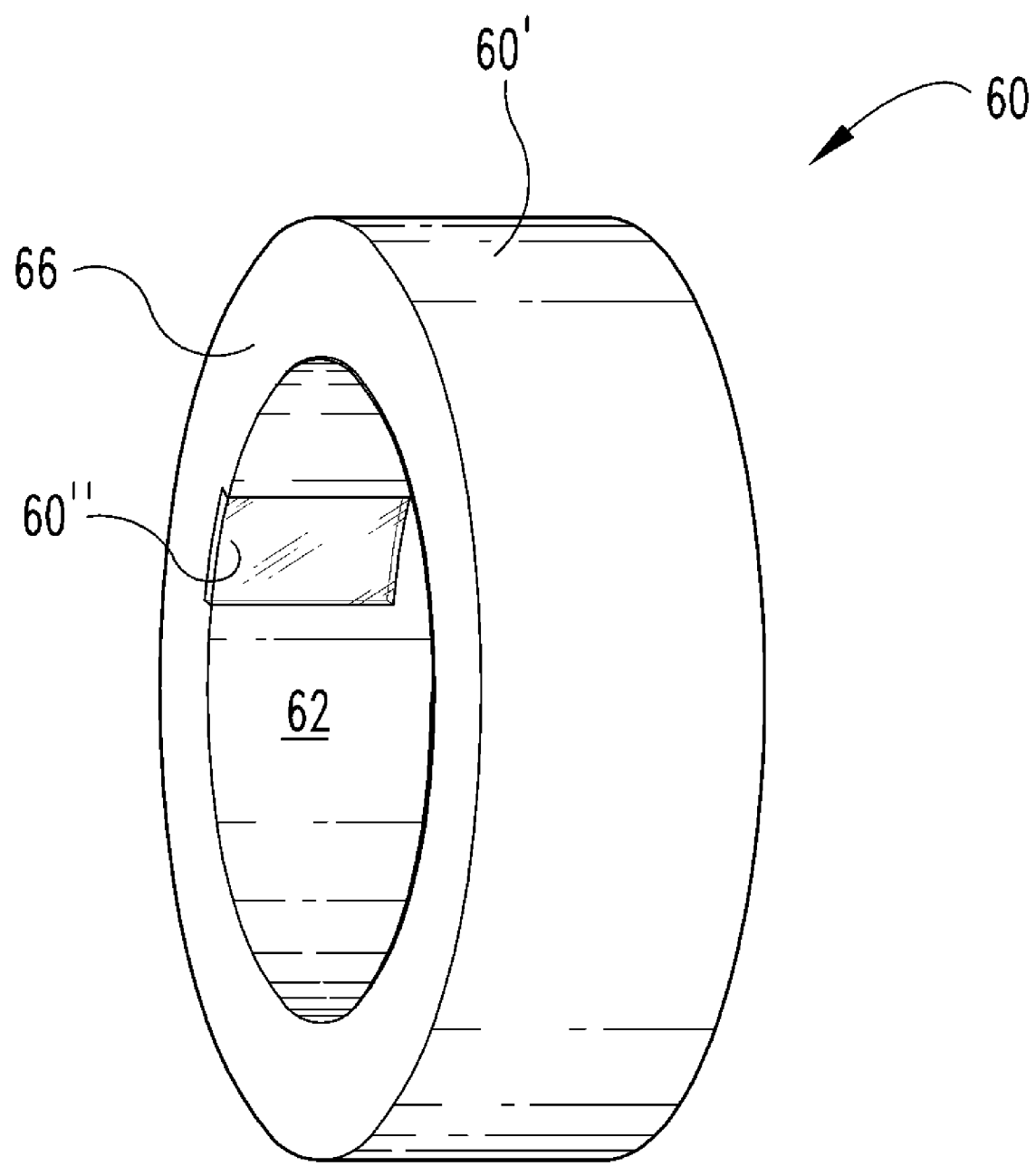
FIG. 11 is a perspective view of an embodiment of the bearing member.

As for material composition, bearing member 60 is preferably a solid, homogenous, block of a low-friction polymeric material. The preferred material at this time is known as VESCONITE HILUBE and is marketed and available from VescoPlastics Sales, PO Box 40647, Cleveland, Johannesburg, 2022 South Africa. However, other bearing materials or configurations are also envisioned within the scope and coverage of this invention. For example, bearing member 60 could be made from a solid block of a low-friction ceramic material. Alternatively, a substantial portion of bearing member 60, including its core, could be made of a metallic material while bearing surfaces 62, 64 and 66 are surfaced or coated or otherwise bonded with a long wearing bearing material such as TEFLON or any one of many other bearing materials that are known to those skilled in the art as show in FIG. 11. FIG. 11 illustrates bearing 60, coating 60' and metallic core 60". Metallic core 60" is illustrated as though a portion of coating 60' corresponding to a small window was removed. This is shown for illustration only, as metallic core 60" is preferably completely covered by coating 60'.

As for its manufacture, bearing member 60 is also preferably a cast polymer material. However, it is also envisioned that bearing member 60 could be manufactured by any machining process or any other process known to those skilled in the art. In the preferred embodiment, the corners 68 and 69 of bearing 60 are also preferably chamfered at approximately a 30 degree angle and a depth of 2-3 mm to ease assembly and limit scoring, as illustrated in FIGS. 2 and 4. The other corners of bearing 60 should or may also be broken to limit edge chipping during assembly as well.

Figures 5, 6:
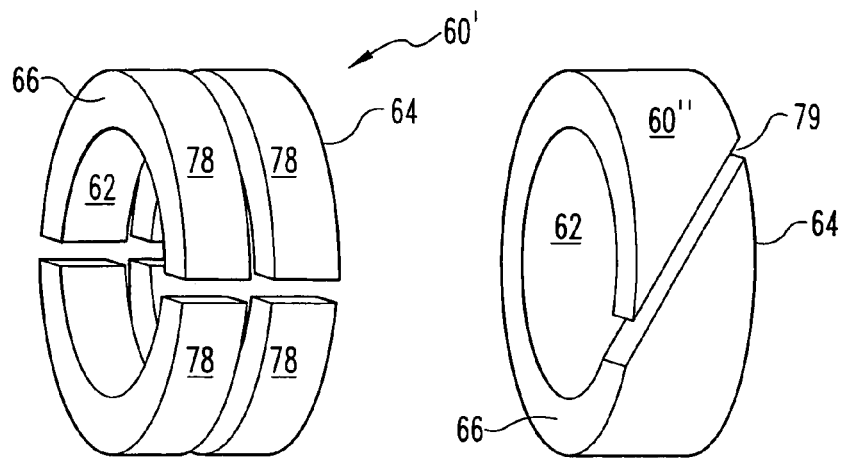
FIG. 5 is a perspective view of an alternate embodiment of the bearing member.
FIG. 6 is a perspective view of an alternate embodiment of the bearing member.

While bearing member 60 is preferably a continuous block of material as described above, it is also envisioned that bearing member 60 could be manufactured in segments as illustrated in FIG. 5 in an alternate embodiment. It could be advantageous to manufacture bearing member 60 in segments due to manufacturing or assembly issues. For example, in some cases it may be easier to obtain the tolerances required by casting bearing 60 in several, smaller detachable members due to shrinkage and warping issues involved in casting thick sections of some materials. FIG. 5 illustrates bearing 60' being split horizontally and axially into four detachable bearing members 78. It is also pointed out that some bearing materials may require or benefit from such a split bearing arrangement to facilitate installation or expansion and contraction of bearing 60 due to temperature variations. For example, FIG. 6 illustrates an alternate embodiment of bearing 60" which includes a single split 79 that is preferably angled to improve the contact area of bearing 60" and to preferably reduce any eccentricity created by the split. Ample consideration should be given to the specifications set by the manufacture of a particular bearing material when determining the optimum configuration of bearing member 60.

Figure 7:
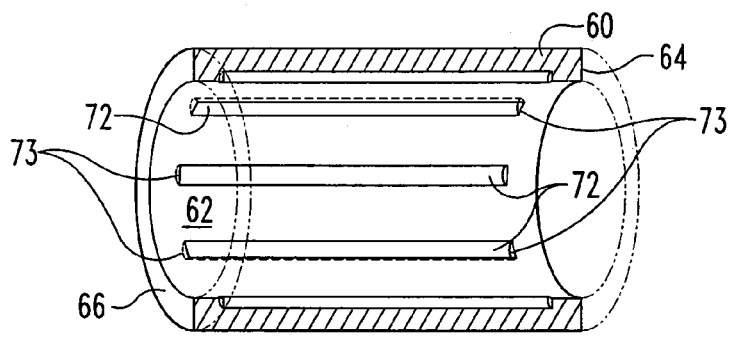
FIG. 7 is a sectional view of an alternate embodiment of a representative bearing member.
Figures 8, 9:
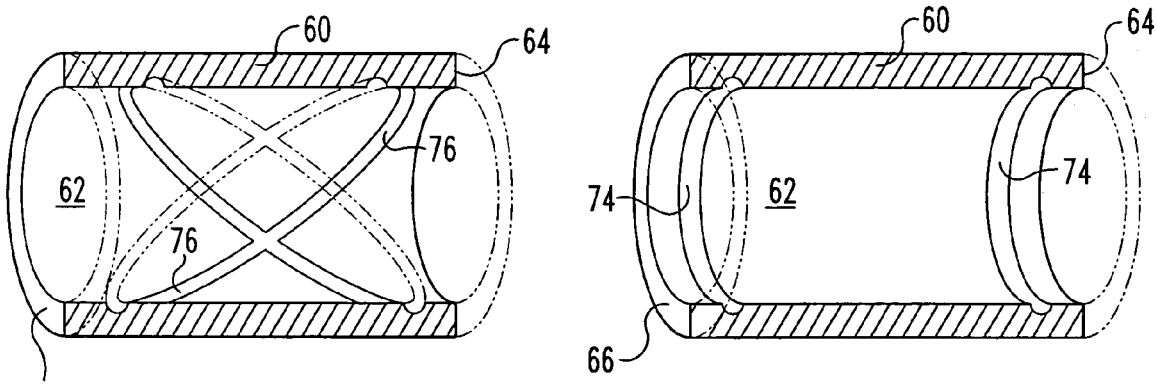
FIG. 8 is a sectional view of an alternate embodiment of a representative bearing member.
FIG. 9 is a sectional view of an alternate embodiment of a representative bearing member.

As illustrated in FIG. 7, bearing 60 in the preferred embodiments herein also preferably includes one or more blind grooves 72 to improve its overall performance. Blind grooves 72 form an effective dirt and debris trap that helps reduce scoring of the bearing surfaces while the blind ends 73 help keep any additional dirt or debris away from the bearing surfaces as well. For the preferred embodiment where bearing 60 is made of VESCONITE HILUBE, such blind grooves 72, if used, should be at least 2 mm deep and at least 3 mm wide to be effective for such purposes. Alternatively, bearing 60 can include circular end grooves 74 such as illustrated in FIG. 8 or loop grooves 76 as illustrated in FIG. 9. These alternative groove geometries can provide improved lubricant distribution if and when external lubrication may be used, while also keeping dirt or debris away from the bearing surfaces during normal and extended use as well. In this regard, it is noted that bearing 60 and grooves 72, 74, and 76 are not intended to be necessarily illustrated to any particular scale in FIGS. 7-9, but are there primarily to illustrate possible configurations and locations for such grooves, if desired. For materials other than VESCONITE HILUBE, ample consideration should be given to the specifications set by the manufacture to determine whether to use grooves and the optimum configuration of any grooves that are used.

Still referring to these bearings 60 in the preferred embodiments herein, there are several characteristics that the material used for these bearing surfaces preferably possesses. First, it is preferable that the bearing material used exhibit characteristics of relatively long wear life in order to maximize the life of the bearing surfaces and thereby minimize their replacement. It is also advantageous for the bearing material to exhibit characteristics of internal or self lubrication to lessen or avoid the necessity of external lubrication. However, use of an external lubricant is also envisioned within the preferred embodiments of the invention herein. If used, the bearing and sliding surfaces in these embodiments would be preferably lubricated during assembly, but would not require additional external lubrication after assembly or during use. Situations and constructions where no external lubrication whatsoever is utilized are envisioned as well, as stated above, as are differential wheel mountings that may require or receive external lubrication through a grease fitting or other means. In this same regard, the use of any such suitable materials as bearing surfaces for bearing 60 is envisioned within the scope and coverage of the invention herein. Ample consideration should also be given to the manufacture's recommendations for possible lubrication of a particular bearing material used in this application.

Other material characteristics and design considerations for the preferred VESCONITE HILUBE can be found in the "VESCONITE and VESCONITE HILUBE Design Manual" which is incorporated by reference herein. This design manual is available at www.vesconite.com.

Bearing member 60 will also preferably include three bearing surfaces 62, 64 and 66. As illustrated in FIG. 4, there will also be clearances between sliding surfaces 50, 52 and 54 and bearing surfaces 62, 64 and 66. Clearance 90 represents the clearance between sliding surface 50 and bearing surface 62 on the load bearing side of differential wheel mounting 100. Clearance 96 represents the clearance between sliding surface 50 and bearing surface 62 on the non-load bearing side of differential wheel mounting 100. In normal operation, the weight of the railroad car forces sliding surface 50 and bearing surface 62 substantially together at the location of clearance 90 while the clearance at the location of clearance 96 widens. As the wheel rotates, the location of clearance 90 and 96 also rotates to maintain the orientation illustrated in FIG. 2. Clearance 92 represents the clearance between sliding surface 52 and bearing surface 64 as illustrated in FIG. 4. Clearance 94 represents the clearance between sliding surface 54 and bearing surface 66 as illustrated in FIG. 4. In normal operation, when the railroad car traverses a corner in which differential wheel mounting 100 is located on the outside rail of the curve, the longitudinal load sustained by wheel 80 may force bearing surface 66 to slide against sliding surface 54, minimizing clearance 94 and maximizing clearance 92.

The exact or preferred clearances 90, 92, 94 and 96 which should be used will vary based upon the materials used in bearing member 60, bearing surfaces 62, 64, and 66 and to some extent upon sliding surfaces 50, 52, 54. Ample consideration should be given to the clearance specifications set by the manufacture of a particular bearing material when determining the clearances for a particular application.

In one embodiment of the current invention, it is preferable to control the static friction between sliding surfaces 50, 52, and 54 and bearing surfaces 62, 64 and 66 such that rotational sliding between bearing 60 and sleeve 40 only occurs when necessary to prevent slippage of one or both wheels when traversing a curved section of track. Controlling the static friction between sliding surfaces 50, 52, and 54 and bearing surfaces 62, 64 and 66 is preferably accomplished by varying parameters of hardness, roughness, lubrication and clearances 90, 92, 94 and 96 while accounting for the reaction to the weight of the railroad car across sliding surfaces 50, 52, and 54 and bearing surfaces 62, 64 and 66 during normal operating conditions. In this regard, the static friction between sliding surfaces 50, 52, and 54 and bearing surfaces 62, 64 and 66 will preferably be greater than the force required to generate opposite longitudinal forces in wheel 80 to create a steering moment generally sufficient to direct flange 86 away from contact with rail 1 when running on substantially straight track. However, the static friction which preferably arises from the reaction to the weight of the railroad car will preferably be low enough for any slippage that must occur when traversing a curved section of track will occur between sliding surfaces 50, 52 and 54 and bearing surfaces 62, 64 and 66 rather than between running surface 88 and rail 1. An alternate approach is to control the static friction such that rotation between sleeve 40 and bearing 60 only preferably occurs when torque is encountered that is significantly less than what is required to cause slippage between running surface 88 and rail 1 when both are relatively dry during normal conditions as well.

It is also preferable that multiple standard sizes of sleeve 40 and bearing 60 be manufactured and stocked by companies in order to allow flexibility when retrofitting existing axles and when replacing components. Multiple sizes of sleeve 40 will preferably allow for normal variations in the actually size of raised wheel seat portion 12 while also maintaining desired fit characteristics as discussed herein and as would be understood by those ordinarily skilled in this industry. Multiple sizes of bearing 60 will preferably allow for sliding surface 50 to be reworked if it becomes excessively worn or damaged without having to deposit additional material on sleeve 40 in order to build up sliding surface 50 to its original diameter. In this way, over time, a wide variety of reworked sleeves 40 with different outer diameters corresponding to sliding surface 50 can be accommodated by manufacturing various bearings 60 with incrementally different internal diameters at their bearing surfaces 62.

In this same way, it is also preferable that multiple configurations of sleeves 40 be manufactured wherein the location of interior lip 46 is varied to accommodate variations in the location and size of raised wheel seat portion 12 and outboard taper 14. Alternatively, in embodiments in which sleeve 40 is press fit on raised wheel seat 12 with sufficient force to maintain the position of sleeve 40 on raised wheel seat 12, the position of sleeve 40 when mounted on raised wheel seat 12 can be controlled by how far onto raised wheel set 12 sleeve 40 is press fit thereby reducing the variants of sleeve 40 required. In this situation internal lip 46 may be preferably omitted from sleeve 40 in order to maximize the utility of individual configurations of sleeve 40.

In the initial retrofit of the differential wheel mounting 100 of the present invention, it is noted that conventional wheel and axle assemblies need to be removed from their interconnection to a standard railroad car or other similar structure. A conventional railroad wheel is preferably first removed from one end of the standard railroad car axle 10 after first removing the adjacent outer axle journal bearing 20. However, it is noteworthy that, for some configurations, it may be possible to remove the standard railroad wheel over the adjacent outer axle journal bearing. In this case, it may be advantageous to perform the initial retrofit while leaving the outer axle journal bearing in place. In any event, only one of the conventional railroad wheel members needs to be removed and replaced in order to enable and accomplish the benefits and the operation of the preferred embodiments of this invention as described herein.

More specifically regarding the initial retrofit situation, after removing the conventional railroad wheel from the raised wheel seat 12, wheel seat 12 is carefully inspected to determine its size as well as its fitness to be further utilized. Any required machining to adjust wheel seat 12, outboard taper 14 or inboard tapers 16 can then be preformed. Next, the position of the remaining conventional wheel in relation to the outboard taper 14 of the wheel seat 12 is preferably measured to determine how far onto wheel seat 12 sleeve 40 should be placed in order to properly position railroad wheel 80 in relation to the conventional railroad wheel remaining to ensure proper engagement with the intended rail gauge. The appropriate sleeve 40 is then selected to insure proper fit as detailed above. Sleeve 40 is then press fit onto wheel seat 12 until the desired position is reached.

The next step in assembly of the differential wheel mounting is normally to install bearing member 60 inside wheel 80. This is accomplished by inserting the desired bearing member 60 into the recess in wheel 80 until bearing member 60 contacts shoulder 82. Keeper ring 84 is then affixed to wheel 80 such that bearing member 60 is securely held between keeper ring 84 and shoulder 82. It is also envisioned that bearing 60 could be press fit into wheel 80. It is envisioned that this embodiment in which bearing 60 is press fit into wheel 80 may be most applicable when bearing 60 is substantially made of a metallic material. However, at the same time, it is understood and intended that any means for fastening bearing 60 to wheel 80 known to those skilled in the art is contemplated by the present invention.

The next assembly step is normally installing the assembled wheel 80 and bearing member 60 onto sleeve 40. Bearing surfaces 62, 64 and 66 of bearing member 60 are generally first pre-lubricated, if desired, and then carefully installed, preferably by sliding bearing 60 over sliding surface 50 of sleeve 40 until bearing surface 66 substantially contacts shoulder 42. Keeper ring 44 may be then installed and affixed to sleeve 40. In one embodiment of the present invention, keeper ring 44 may be segmented (not illustrated) to allow installation of keeper ring 44 over the top of journal 20 where the interior diameter of keeper ring 44 may be too small to permit installation over journal bearing 20. In any event, as previously discussed, it is understood and intended that any means for fastening keeper ring 44 to sleeve 40 known to those skilled in the art is contemplated by the present invention.

At this point, wheel 80 is preferably rotatable about axle 10 independently of the rotation of axle 10 by the contact between bearing surfaces 62, 64 and 66 with sliding surfaces 50, 52 and 54. This provides the standard railroad car axle with one wheel that is capable of independent wheel rotation. This in turn permits the relative rotation or slipping of one of the railroad wheel members on rounding a curve which preferably substantially reduces frictional wear between the running surface 88 of the railroad wheel 80 and rail 1.

It is noted that this modification of a conventional wheel and axle assembly typically used on railroad cars preferably can be readily and efficiently preformed by standard railroad maintenance personnel with typical skills and using common and available equipment. It is envisioned that the initial modification could take place as a field modification as required due to normal replacement of components, such as after a wheel or journal bearing has been damaged or has reached the end of its useful life. Furthermore, maintenance of this differential wheel mounting preferably can also be readily and efficiently preformed by the same standard railroad maintenance personnel with the same typical skills and common equipment.

It is also noted that while the preferred embodiment of the invention disclosed above locates the surfaces of rotation between the bearing 60 and sleeve 40, it is also contemplated that the actual bearing surfaces and surfaces of rotation could be located between wheel 80 and bearing 60. In such an embodiment or situation, bearing 60 is preferably firmly coupled to sleeve 40 and wheel 80 would preferably have surfaces of rotation that are adapted for long wear life similar to those disclosed for sleeve 40 above (not illustrated).

While the invention has been illustrated and described in detail in the drawings and foregoing description, the same is to be considered as illustrative and not restrictive in character, it being understood that only selected embodiments have been shown and described and that all equivalents, changes, and modifications that come within the spirit of the inventions as defined herein or by the following claims are desired to be protected.

What is claimed is:

1. A differential wheel mounting for use on railroad cars having a railroad car axle with a wheel seat portion adjacent to at least one end and a wheel rotatably mounted relative to the axle on the wheel seat portion, the differential wheel mounting comprising:
a sleeve for fixedly mounting on the wheel seat portion of the axle, said sleeve having sliding surfaces;
a railroad wheel having a running surface for contacting a rail; and
a plain bearing member detachably mountable to said railroad wheel and laterally confined on said sleeve, said plain bearing member having non-metallic bearing surfaces which mate with said sliding surfaces on said sleeve to sustain radial and thrust loads experienced during normal operation.

2. The differential wheel mounting of claim 1, in which said sleeve further includes a detachably mounted first keeper that includes at least one of said sliding surfaces, wherein removal of said first keeper facilitates removal of said bearing member from said sleeve.

3. The differential wheel mounting of claim 2, in which said railroad wheel further includes a detachably mounted second keeper, wherein removal of said second keeper facilitates removal of said bearing member from said wheel.

4. The differential wheel mounting of claim 1, wherein said bearing member is a continuous and homogenous block of non-metallic material.

5. The differential wheel mounting of claim 1, wherein said bearing member is substantially formed of a metallic block wherein said bearing surfaces are substantially coated with a non-metallic polymeric material.

6. The differential wheel mounting of claim 1, wherein said sliding surfaces and said bearing surfaces are located closer to the axle than to said running surface.

7. The differential wheel mounting of claim 1, wherein said bearing member includes a groove in at least one of said bearing surfaces.

8. The differential wheel mounting of claim 1, wherein the static friction between said sliding surfaces and said bearing surfaces that arises from the reaction to the weight of the railroad car is less than the force required to initiate slippage of said wheel on the rail when traversing a curved section of track during normal operation.

9. A differential wheel mounting for a railroad car having a standard railroad car axle with a raised wheel seat portion and a journal bearing adjacent to at least one end, the differential wheel mounting comprising:
a sleeve mounted to the raised wheel seat portion on the axle, said sleeve having a first shoulder and including a first keeper;
a railroad wheel having a running surface for contacting a rail and a second shoulder and including a second keeper; and
a plain bearing member positioned between said sleeve and said wheel;
wherein said first shoulder and said first keeper laterally confine said bearing member with respect to said sleeve and said second shoulder and said second keeper laterally confine said bearing member with respect to said wheel;
wherein said bearing member sustains radial and thrust loads during normal operation of the railroad car; and
wherein said bearing member allows for rotationally slippage relative to said railroad wheel and said sleeve.

10. The differential wheel mounting of claim 9, wherein said bearing member sustains all loads between said railroad wheel and said sleeve.

11. The differential wheel mounting of claim 9, wherein said bearing member can be removed from said sleeve when said first keeper is removed from said sleeve.

12. The differential wheel mounting of claim 11, wherein said bearing member and said first keeper can be removed from said sleeve or placed on said sleeve with the journal bearing remaining in place on the end of the axle.

13. The differential wheel mounting of claim 9, wherein said sleeve is press fit on the raised wheel seat portion of the axle.

14. The differential wheel mounting of claim 9, further comprising an interior lip located on the outboard side of said sleeve, wherein said interior lip substantially limits how far inboard said sleeve can be positioned on the axle over the raised wheel seat portion.

15. The differential wheel mounting of claim 9, further comprising a sleeve clamp that is detachably mounted to the circumference of said sleeve on the inboard side of the axle, wherein said sleeve clamp interfaces with the raised wheel seat portion of the axle to substantially constrain movement of said sleeve over the axle in the outboard direction.

16. The differential wheel mounting of claim 9, wherein said bearing member is a substantially homogenous block of a substantially polymeric material.

17. The differential wheel mounting of claim 9, wherein said bearing member is substantially made of a ceramic material.

18. The differential wheel mounting of claim 9, wherein said bearing member is a metallic block which is substantially coated with a non-metallic material.

19. The differential wheel mounting of claim 9, wherein said bearing member is composed of at least two detachable members.

20. The differential wheel mounting of claim 19, wherein said detachable members each sustains both substantial radial loads and substantial thrust loads during normal operation.

21. The differential wheel mounting of claim 9, wherein said bearing member is securely mounted to said wheel.

22. The differential wheel mounting of claim 21, further comprising said bearing member having a plurality of bearing surfaces, said sleeve and said first keeper having a plurality of sliding surfaces which slidably engage said bearing surfaces, wherein the static friction between said sliding surfaces and said bearing surfaces that arises from the reaction to the weight of the railroad car is less than the force required to initiate slippage of said wheel on the rail when traversing a curved section of track during normal operation.

23. The differential wheel mounting of claim 9, wherein an inner surface of said bearing member is substantially cylindrical.

24. The differential wheel mounting of claim 9, wherein said sliding surfaces and said bearing surfaces are located closer to the axle than to said running surface.

25. The differential wheel mounting of claim 9, wherein said sleeve and said first keeper are made of a stainless steel material.

26. A method for retrofitting a railroad car axle having fixed wheels mounted on wheel seat portions with at least one differential wheel mounting, comprising the steps of:
removing the fixed wheel from one wheel seat portion on the axle;
securely mounting a sleeve on the wheel seat portion, said sleeve including a first shoulder and a first keeper;
detachably mounting a plain bearing member to a railroad wheel having an outer running surface for contacting a rail, said railroad wheel including a second shoulder and a second keeper, wherein said second shoulder and said second keeper laterally confine said bearing member with respect to said wheel; and
rotationally mounting the plain bearing member on the sleeve so that the plain bearing member is laterally confined on the sleeve to sustain radial and thrust loads experienced during normal operation, wherein said first shoulder and said first keeper laterally confine said bearing member with respect to said sleeve.

27. The method according to claim 26 wherein the plain bearing member has non-metallic bearing surfaces.

28. The method according to claim 26 further comprising the steps of:
providing different sleeves appropriate to fit different wheel seat portions; and
selecting the appropriate sleeve for said mounting steps.

29. The method according to claim 28, further comprising the steps of:
providing different plain bearing members appropriate to fit the different sleeves; and
selecting the appropriate bearing member for said mounting steps.

30. The method according to claim 29, further comprising the steps of:
providing different first keepers appropriate to fit the different sleeves and the different plain bearing members; and
selecting the appropriate first keeper for retaining the bearing member following the mounting steps.

\* \* \* \* \*

UNITED STATES PATENT AND TRADEMARK OFFICE
CERTIFICATE OF CORRECTION

| | | |
|---|---|---|
| PATENT NO. | : 7,316,436 B1 | Page 1 of 1 |
| APPLICATION NO. | : 11/359652 | |
| DATED | : January 8, 2008 | |
| INVENTOR(S) | : John Kummings | |

It is certified that error appears in the above-identified patent and that said Letters Patent is hereby corrected as shown below:

On Page 2 of the Patent Cover Item [56] under References cited, patent document 4,575,145 to Wolfram et al., delete the "*" designation.

Signed and Sealed this

Sixth Day of May, 2008

JON W. DUDAS
*Director of the United States Patent and Trademark Office*